US010176017B2

(12) United States Patent
Cropper et al.

(10) Patent No.: US 10,176,017 B2
(45) Date of Patent: *Jan. 8, 2019

(54) CONFIGURATION MANAGEMENT FOR A SHARED POOL OF CONFIGURABLE COMPUTING RESOURCES

(71) Applicant: International Business Machines Corporation, Armonk, NY (US)

(72) Inventors: Joseph W. Cropper, Rochester, MN (US); Jeffrey W. Tenner, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/866,977

(22) Filed: Sep. 27, 2015

(65) Prior Publication Data
US 2017/0075728 A1 Mar. 16, 2017

Related U.S. Application Data

(63) Continuation of application No. 14/852,595, filed on Sep. 13, 2015.

(51) Int. Cl.
*G06F 9/48* (2006.01)
*G06F 9/50* (2006.01)
*G06F 9/54* (2006.01)

(52) U.S. Cl.
CPC .......... *G06F 9/5011* (2013.01); *G06F 9/4881* (2013.01); *G06F 9/542* (2013.01)

(58) Field of Classification Search
CPC ....... G06F 9/5011; G06F 9/4881; G06F 9/542
See application file for complete search history.

(56) References Cited

U.S. PATENT DOCUMENTS 7,321,992 B1 * 1/2008 Vellore ................ G06F 11/004
714/13
8,140,816 B2 3/2012 Hofer et al.
(Continued)

FOREIGN PATENT DOCUMENTS

CN 103559072 A 2/2014
CN 104038392 A 9/2014

OTHER PUBLICATIONS

Mell, Peter, et al., The NIST Definition of Cloud Computing, National Institute of Standards and Technology, Oct. 7, 2009, Version 15, NIST, Gaithersburg, MD, US.
(Continued)

*Primary Examiner* — Emerson C Puente
*Assistant Examiner* — Jonathan R Labud
(74) *Attorney, Agent, or Firm* — James L. Olsen (57) ABSTRACT

Disclosed aspects manage a shared pool of configurable computing resources. A set of scaling factor data is monitored. The set of scaling factor data is related to a workload on a configuration of the shared pool of configurable computing resources. A set of workload resource data associated with the workload is ascertained. Using the set of scaling factor data and the set of workload resource data, a triggering event is detected. In response to detecting the triggering event, a configuration action (with respect to the configuration of the shared pool of configurable computing resources) is performed.

18 Claims, 5 Drawing Sheets

(56) References Cited

U.S. PATENT DOCUMENTS

| | | | |
|---|---|---|---|
| 8,423,998 B2 | 4/2013 | Isci et al. | |
| 8,566,835 B2 | 10/2013 | Wang et al. | |
| 8,631,458 B1 | 1/2014 | Banerjee | |
| 8,756,609 B2 | 6/2014 | Dasgupta et al. | |
| 8,825,550 B2 | 9/2014 | Marr et al. | |
| 2004/0128670 A1 | 7/2004 | Robinson et al. | |
| 2006/0149695 A1* | 7/2006 | Bossman | G06F 17/30315 706/48 |
| 2006/0184937 A1* | 8/2006 | Abels | G06F 8/65 718/1 |
| 2006/0212746 A1 | 9/2006 | Amegadzie et al. | |
| 2007/0208844 A1* | 9/2007 | Armstrong | G06F 9/4843 709/223 |
| 2008/0168182 A1* | 7/2008 | Frank | G06F 1/12 709/248 |
| 2008/0270693 A1* | 10/2008 | Jacobson | G06F 3/0604 711/114 |
| 2009/0070771 A1* | 3/2009 | Yuyitung | G06Q 10/06 718/105 |
| 2009/0217267 A1 | 8/2009 | Gebhart et al. | |
| 2009/0288084 A1 | 11/2009 | Astete et al. | |
| 2010/0050172 A1 | 2/2010 | Ferris | |
| 2010/0257531 A1 | 10/2010 | Barsness et al. | |
| 2010/0306163 A1* | 12/2010 | Beaty | G06F 9/5077 706/52 |
| 2010/0325132 A1 | 12/2010 | Liu et al. | |
| 2011/0131589 A1 | 6/2011 | Beaty et al. | |
| 2011/0302578 A1 | 12/2011 | Isci et al. | |
| 2012/0137002 A1 | 5/2012 | Ferris et al. | |
| 2012/0204187 A1* | 8/2012 | Breiter | G06F 9/5072 718/105 |
| 2013/0073601 A1* | 3/2013 | Jenkins | G06F 9/547 709/201 |
| 2013/0097601 A1 | 4/2013 | Podvratnik et al. | |
| 2013/0124669 A1 | 5/2013 | Anderson et al. | |
| 2013/0174149 A1 | 7/2013 | Dasgupta et al. | |
| 2013/0185729 A1 | 7/2013 | Vasic et al. | |
| 2013/0318221 A1* | 11/2013 | Anaya | G06F 9/505 709/223 |
| 2013/0326506 A1* | 12/2013 | McGrath | G06F 9/45558 718/1 |
| 2014/0040885 A1 | 2/2014 | Donahue | |
| 2014/0047443 A1 | 2/2014 | Mann | |
| 2014/0082612 A1* | 3/2014 | Breitgand | G06F 9/45533 718/1 |
| 2014/0258446 A1* | 9/2014 | Bursell | G06F 15/177 709/217 |
| 2014/0337832 A1 | 11/2014 | Adogla | |
| 2015/0112915 A1 | 4/2015 | Michael et al. | |
| 2015/0366000 A1* | 12/2015 | Bedekar | H04W 84/042 370/328 |
| 2017/0024255 A1 | 1/2017 | Cropper et al. | |
| 2017/0024257 A1 | 1/2017 | Cropper et al. | |

OTHER PUBLICATIONS

Wang, W. et al., An availability-aware virtual machine placement approach for dynamic scaling of cloud applications, 2012 9th International Conference on Ubiquitous Intelligence and Computing and 9th International Conference on Autonomic and Trusted Computing.

Liu, Z. et al., Workload-aware and Cpu frequency scaling for optimal energy consumption in VM allocation, Mathematical Problems in Engineering, vol. 2014, Article ID 906098, 12 pages, <http://dx.doi.org/10.1155/2014/906098>.

Teng, F. et al., An Energy-Efficient VM Placement in Cloud Datacenter, IEEE, 2014.

Dynamic identification and pinning of workloads to certain physical servers to minimize placement entropy, IP.com, Feb. 26, 2014.

System and Apparatus for deploying workloads in Cloud based on Application Type and workloads relationships, IP.com, May 13, 2011.

Yazdanov, Lenar, et al., "Vscaler: Autonomic virtual machine scaling." Cloud Computing (CLOUD), 2013 IEEE Sixth International Conference on. IEEE, 2013.

Guo, Yanfei, et al., "Coordinated VM Resizing and Server Tuning: Throughput, Power Efficiency and Scalability", 2012 IEEE 20th International Symposium on Modeling, Analysis and Simulation of Computer and Telecommunication Systems.

Tuczai, Eva, "Workload Rightsizing using the VMTurbo Economic Scheduling Engine", VMTurbo Product Forum, <https://greencircle.vmturbo.com/community/products/blog/2015/02/15/workload-rightsizing-and-vmturbo>.

Cropper et al., "Configuration Management for a Shared Pool of Configurable Computing Resources", U.S. Appl. No. 14/852,595, filed Sep. 13, 2015.

List of IBM Patents or Patent Applications Treated as Related, Mar. 27, 2017, 2 pgs.

List of IBM Patents or Patent Applications Treated as Related, Jun. 13, 2017, 2 pgs.

Cropper et al., "Managing a Shared Pool of Configurable Computing Resources Using a Set of Scaling Factors and a Set of Workload Resource Data," U.S. Appl. No. 15/598,709, filed May 18, 2017.

Cropper et al., "Managing a Shared Pool of Configurable Computing Resources Using a Set of Scaling Factors and a Set of Workload Resource Data," U.S. Appl. No. 15/598,738, filed May 18, 2017.

* cited by examiner

CONFIGURATION MANAGEMENT FOR A SHARED POOL OF CONFIGURABLE COMPUTING RESOURCES

BACKGROUND

This disclosure relates generally to computer systems and, more particularly, relates to managing a shared pool of configurable computing resources. The amount of data that needs to be managed by enterprises is increasing. Management of a shared pool of configurable computing resources may be desired to be performed as efficiently as possible. As data needing to be managed increases, the need for management efficiency may increase.

SUMMARY

Aspects of the disclosure can monitor a set of scaling factor data and automatically/dynamically resize one or more virtual machines. Virtualization/cloud software may be coupled for maintaining/managing virtual machines on hosts with scaling factors indicating resource requirements for features such as hardware components. Accordingly, a cloud environment configuration/arrangement may be dynamically reconfigured/rearranged. Such configuration actions may occur in an ongoing basis by monitoring scaling factors and by using management/optimization techniques with respect to the scaling factors/resource requirements.

Aspects of the disclosure include managing a shared pool of configurable computing resources. A set of scaling factor data is monitored. The set of scaling factor data is related to a workload on a configuration of the shared pool of configurable computing resources. A set of workload resource data associated with the workload is ascertained. Using the set of scaling factor data and the set of workload resource data, a triggering event is detected. In response to detecting the triggering event, a configuration action (with respect to the configuration of the shared pool of configurable computing resources) is performed.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the disclosure can monitor a set of scaling factor data and automatically/dynamically resize one or more virtual machines. Virtualization/cloud software may be coupled for maintaining/managing virtual machines on hosts with scaling factors indicating resource requirements for features such as hardware components. Accordingly, a cloud environment configuration/arrangement may be dynamically reconfigured/rearranged (e.g., without utilizing user intervention when reconfiguring/rearranging). Such configuration actions may occur in an ongoing basis by monitoring scaling factors (e.g., in addition to or instead of monitoring memory usage or processor utilization) and by using management/optimization techniques (e.g., avoiding frequent resizes which can burden availability due to rebooting of virtual machines) with respect to the scaling factors/resource requirements.

Cloud management software may use templates/flavors to define a limited set of predefined resource configurations to ease in specifying the size of a virtual machine. It may then be the responsibility of the cloud administrator to work-out a portion of these templates for the various types of workloads to be run-on. Users may be faced with adjusting the values for individual virtual machines based on their own understanding of the workload and scale they intend to run. This can result in the users making decisions in areas they have little experience or in improperly sized virtual machines. As such, neither the cloud administrator nor cloud user may have appropriate information to efficiently manage resource requirements for the virtual machines for a given scale. Disclosed aspects may provide performance or efficiency benefits with respect to this characteristic.

Aspects of the disclosure include a method, system, and computer program product of managing a shared pool of configurable computing resources. A set of scaling factor data (e.g., transactions per day) is monitored. The set of scaling factor data is related to a workload (e.g., an instantiation of one or more images) on a configuration of the shared pool of configurable computing resources. A set of workload resource data associated with the workload is ascertained. Using the set of scaling factor data and the set of workload resource data, a triggering event is detected. In response to detecting the triggering event, a configuration action (with respect to the configuration of the shared pool of configurable computing resources) is performed.

In embodiments, the set of scaling factor data related to the workload is collected. The set of scaling factor data can include at least one of a set of transaction processing scaling factor data, a set of user access scaling factor data, a set of entity storage scaling factor data, a set of product usage scaling factor data, or a set of provider-defined scaling factor data. In embodiments, detecting the triggering event includes identifying that a first value of a parameter of the set of scaling factor data differs (e.g., exceeds a threshold difference) with respect to a second value of the parameter of the set of workload resource data.

In embodiments, the configuration action includes modifying the configuration of the shared pool of configurable computing resources. Modifying the configuration can include changing a configuration of at least one of a set of processing resources, a set of memory resources, a set of disk resources, or a set of virtual machines. Altogether, performance or efficiency benefits when managing a shared pool of configurable computing resources may occur (e.g., speed, flexibility, load balancing, responsiveness, resource usage, productivity). Aspects may save resources such as bandwidth, processing, or memory.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
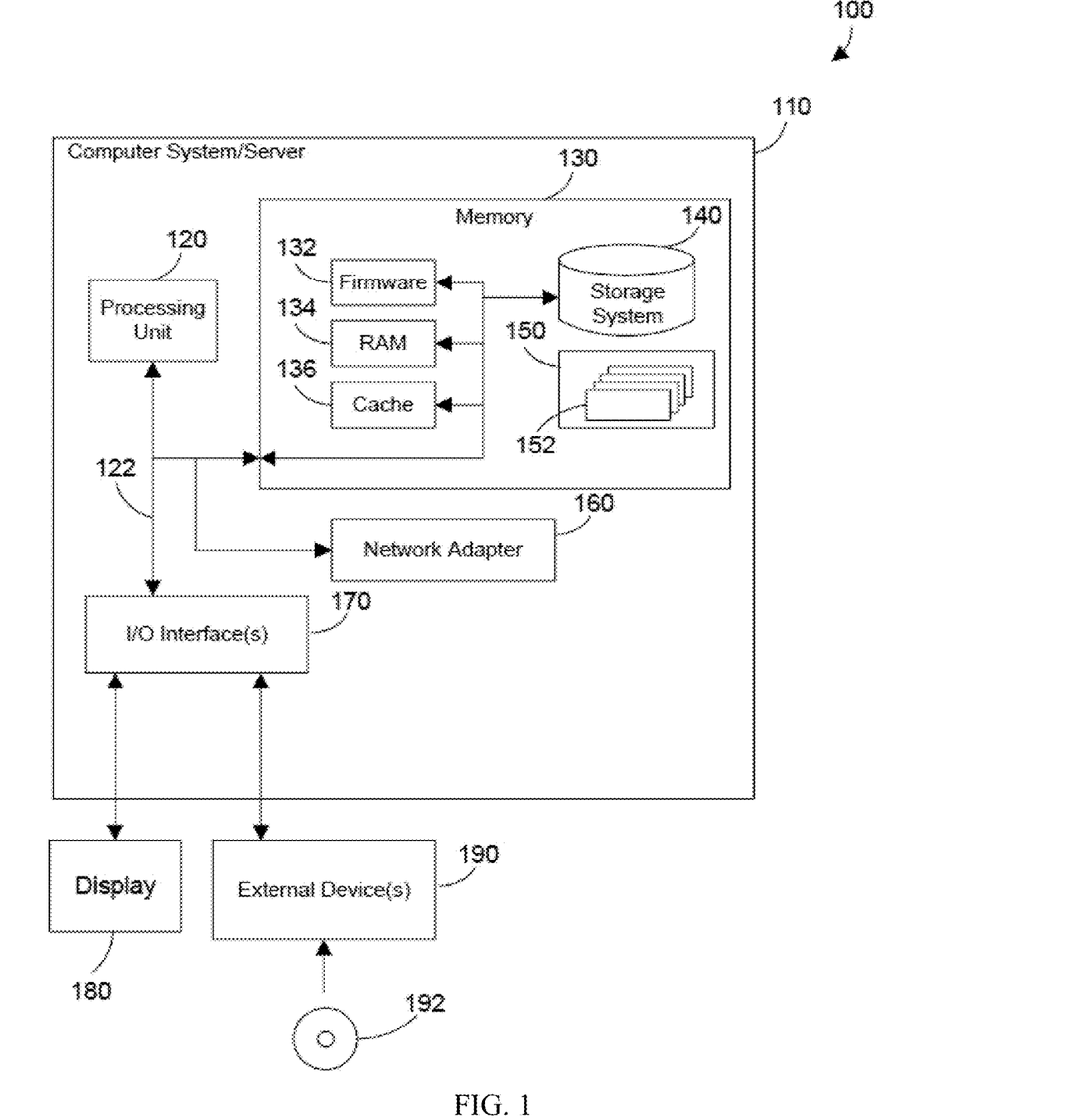
FIG. 1 depicts a cloud computing node according to embodiments.

Referring now to FIG. 1, a block diagram of an example of a cloud computing node is shown. Cloud computing node 100 is only one example of a suitable cloud computing node and is not intended to suggest any limitation as to the scope of use or functionality of embodiments of the invention described herein. Regardless, cloud computing node 100 is capable of being implemented and/or performing any of the functionality set forth hereinabove.

In cloud computing node 100 there is a computer system/server 110, which is operational with numerous other general purpose or special purpose computing system environments or configurations. Examples of well-known computing systems, environments, and/or configurations that may be suitable for use with computer system/server 110 include, but are not limited to, personal computer systems, server computer systems, tablet computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 110 may be described in the general context of computer system executable instructions, such as program modules, being executed by a computer system. Generally, program modules may include routines, programs, objects, components, logic, data structures, and so on that perform particular tasks or implement particular abstract data types. Computer system/server 110 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 110 in cloud computing node 100 is shown in the form of a general-purpose computing device. The components of computer system/server 110 may include, but are not limited to, one or more processors or processing units 120, a system memory 130, and a bus 122 that couples various system components including system memory 130 to processing unit 120.

Bus 122 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 110 typically includes a variety of computer system readable media. Such media may be any available media that is accessible by computer system/server 110, and it includes both volatile and non-volatile media, removable and non-removable media. An example of removable media is shown in FIG. 1 to include a Digital Video Disc (DVD) 192.

System memory 130 can include computer system readable media in the form of volatile or non-volatile memory, such as firmware 132. Firmware 132 provides an interface to the hardware of computer system/server 110. System memory 130 can also include computer system readable media in the form of volatile memory, such as random access memory (RAM) 134 and/or cache memory 136. Computer system/server 110 may further include other removable/non-removable, volatile/non-volatile computer system storage media. By way of example only, storage system 140 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 122 by one or more data media interfaces. As will be further depicted and described below, memory 130 may include at least one program product having a set (e.g., at least one) of program modules that are configured to carry out the functions described in more detail below.

Program/utility 150, having a set (at least one) of program modules 152, may be stored in memory 130 by way of example, and not limitation, as well as an operating system, one or more application programs, other program modules, and program data. Each of the operating system, one or more application programs, other program modules, and program data or some combination thereof, may include an implementation of a networking environment. Program modules 152 generally carry out the functions and/or methodologies of embodiments of the invention as described herein.

Computer system/server 110 may also communicate with one or more external devices 190 such as a keyboard, a pointing device, a display 180, a disk drive, etc.; one or more devices that enable a user to interact with computer system/server 110; and/or any devices (e.g., network card, modem, etc.) that enable computer system/server 110 to communicate with one or more other computing devices. Such communication can occur via Input/Output (I/O) interfaces 170. Still yet, computer system/server 110 can communicate with one or more networks such as a local area network (LAN), a general wide area network (WAN), and/or a public network (e.g., the Internet) via network adapter 160. As depicted, network adapter 160 communicates with the other components of computer system/server 110 via bus 122. It should be understood that although not shown, other hardware and/or software components could be used in conjunction with computer system/server 110. Examples, include, but are not limited to: microcode, device drivers, redundant processing units, external disk drive arrays, Redundant Array of Independent Disk (RAID) systems, tape drives, data archival storage systems, etc.

Figure 2:
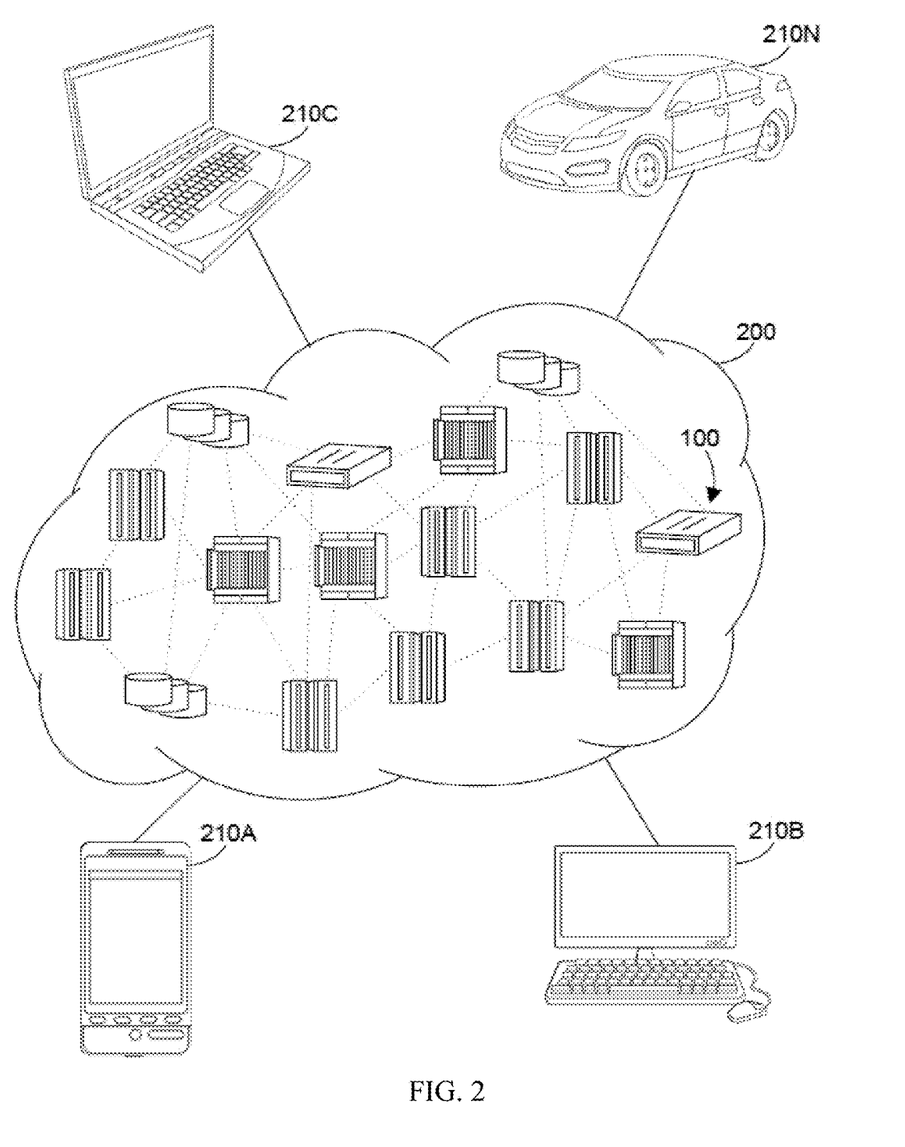
FIG. 2 depicts a cloud computing environment according to embodiments.

Referring now to FIG. 2, illustrative cloud computing environment 200 is depicted. As shown, cloud computing environment 200 comprises one or more cloud computing nodes 100 with which local computing devices used by cloud consumers, such as, for example, personal digital assistant (PDA) or cellular telephone 210A, desktop computer 210B, laptop computer 210C, and/or automobile computer system 210N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 200 to offer infrastructure, platforms and/or software as services for which a cloud consumer does not need to maintain resources on a local computing device. It is understood that the types of computing devices 210A-N shown in FIG. 2 are intended to be illustrative only and that computing nodes 100 and cloud computing environment 200 can communicate with any type of computerized device over any type of network and/or network addressable connection (e.g., using a web browser).

Figure 3:
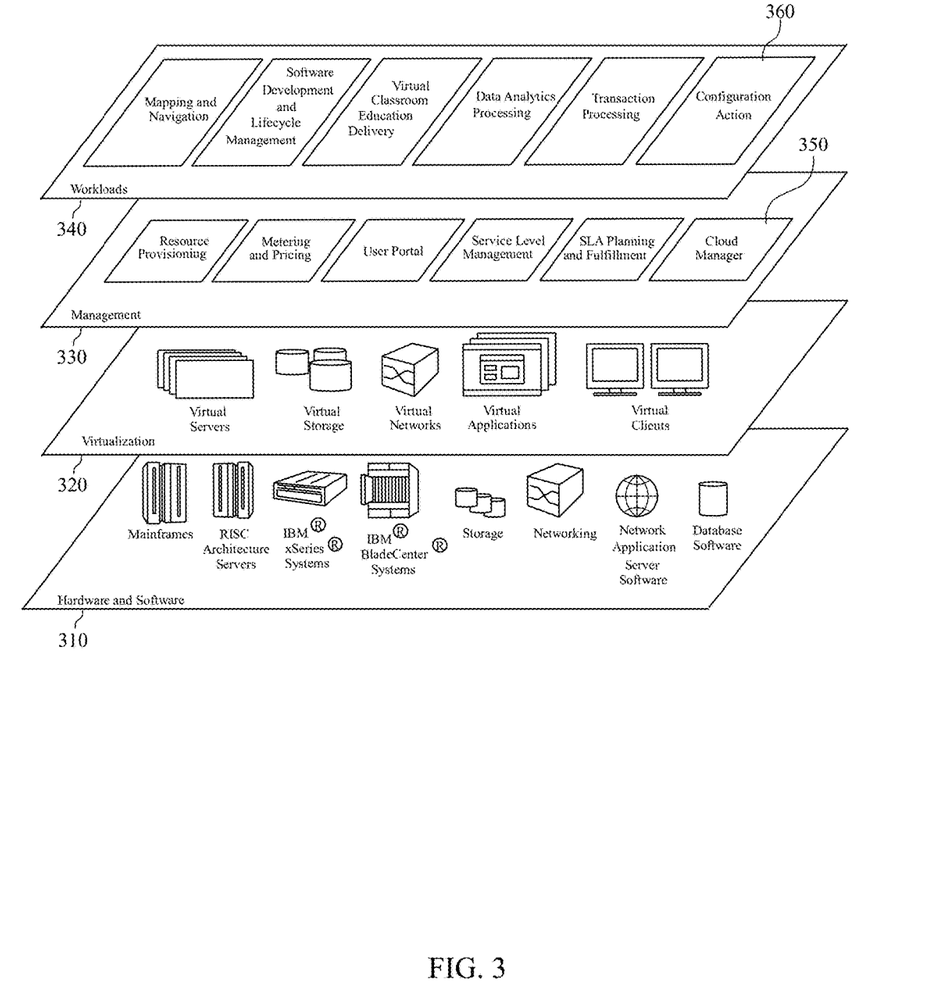
FIG. 3 depicts abstraction model layers according to embodiments.

Referring now to FIG. 3, a set of functional abstraction layers provided by cloud computing environment 200 in FIG. 2 is shown. It should be understood in advance that the components, layers, and functions shown in FIG. 3 are intended to be illustrative only and the disclosure and claims are not limited thereto. As depicted, the following layers and corresponding functions are provided.

Hardware and software layer 310 includes hardware and software components. Examples of hardware components include mainframes, in one example IBM System z systems; RISC (Reduced Instruction Set Computer) architecture based servers, in one example IBM System p systems; IBM System x systems; IBM BladeCenter systems; storage devices; networks and networking components. Examples of software components include network application server software, in one example IBM WebSphere® application server software; and database software, in one example IBM DB2® database software. IBM, System z, System p, System x, BladeCenter, WebSphere, and DB2 are trademarks of International Business Machines Corporation registered in many jurisdictions worldwide.

Virtualization layer 320 provides an abstraction layer from which the following examples of virtual entities may be provided: virtual servers; virtual storage; virtual networks, including virtual private networks; virtual applications and operating systems; and virtual clients.

In one example, management layer 330 may provide the functions described below. Resource provisioning provides dynamic procurement of computing resources and other resources that are utilized to perform tasks within the cloud computing environment. Metering and Pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal provides access to the cloud computing environment for consumers and system administrators. Service level management provides cloud computing resource allocation and management such that required service levels are met. Service Level Agreement (SLA) planning and fulfillment provide pre-arrangement for, and procurement of, cloud computing resources for which a future requirement is anticipated in accordance with an SLA. A cloud manager 350 is representative of a cloud manager (or shared pool manager) as described in more detail below. While the cloud manager 350 is shown in FIG. 3 to reside in the management layer 330, cloud manager 350 can span all of the levels shown in FIG. 3, as discussed below.

Workloads layer 340 provides examples of functionality for which the cloud computing environment may be utilized. Examples of workloads and functions which may be provided from this layer include: mapping and navigation; software development and lifecycle management; virtual classroom education delivery; data analytics processing; transaction processing; and a configuration action 360, which may be used as discussed in more detail below.

Figure 4:
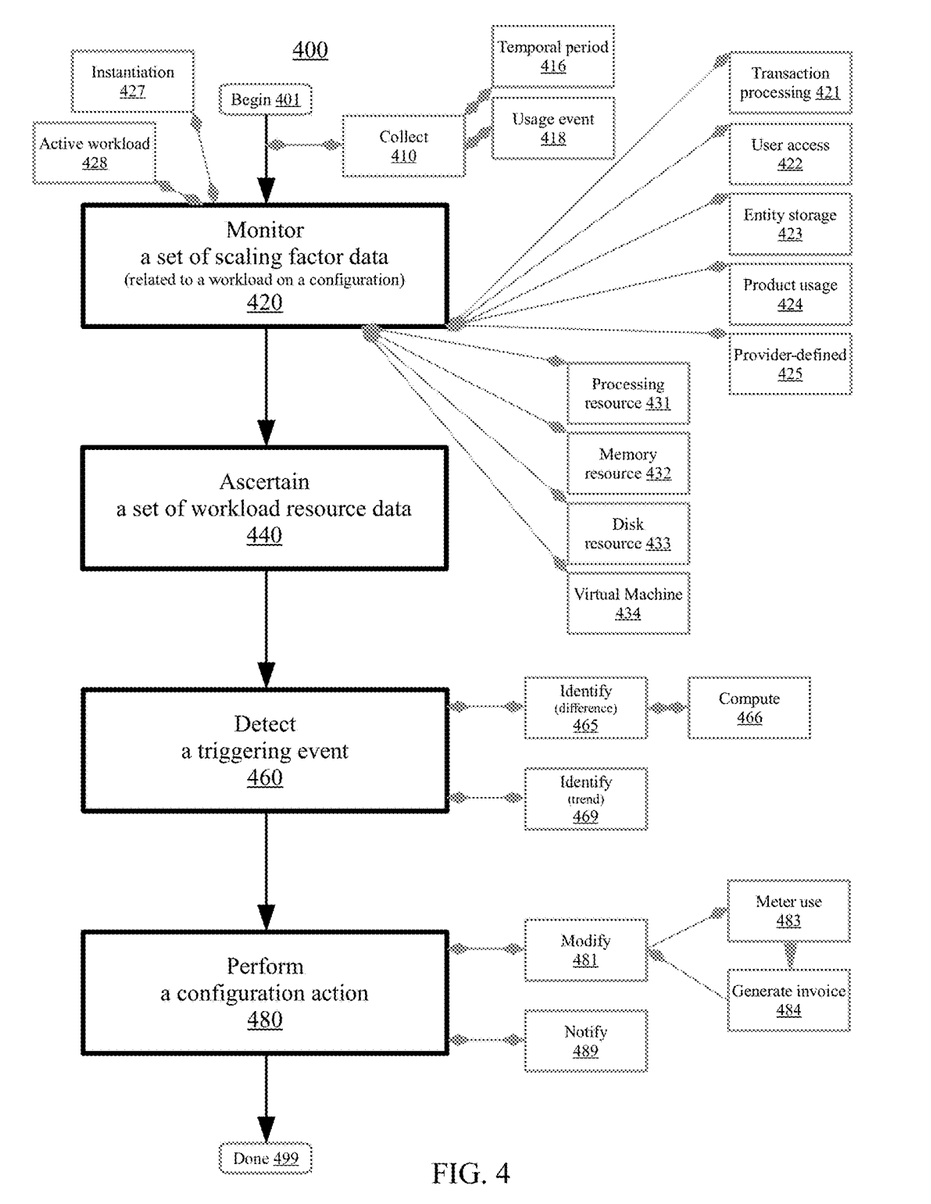
FIG. 4 is a flowchart illustrating a method of managing a shared pool of configurable computing resources according to embodiments.

FIG. 4 is a flowchart illustrating a method 400 of managing a shared pool of configurable computing resources according to embodiments. The shared pool of configurable computing resources may utilize a shared pool manager (e.g., a controller, a cloud manager) to execute/carry-out processes/tasks. For example, virtual machines in a cloud environment (e.g., public, private, hybrid) can be maintained, managed, configured, reconfigured, arranged, or rearranged utilizing resource requirements (e.g., number of virtual processors, amount of memory, disk space) for the virtual machines based on requirements for the workload and the scale which it is run. The shared pool manager may or may not be included in the shared pool of configurable computing resources. Method 400 may begin at block 401.

In embodiments, a set of scaling factor data related to a workload may be collected at block 410. Collection can include gathering current scaling factor values for the workload. Collection may be performed using a pull technique (e.g., retrieving the set of scaling factor data from the workload), a publish-subscription technique (e.g., the workload pushes-out the set of scaling factor data), or the like. An authentication key or credential may be registered/used to authorize collection of the set of scaling factor data (e.g., for the workload to allow/grant access/permission).

In various embodiments, collection of the set of scaling factor data may occur on a polling schedule (e.g., at a frequency of a temporal period at block 416) or based on an event (e.g., in response to a usage event at block 418). To illustrate, in response to collecting the set of scaling factor data related to the workload, an operation may wait for a temporal period (e.g., 0 minutes, 10 minutes, 24 hours). In response to waiting for the temporal period, the set of scaling factor data related to the workload may be collected (again). Implementing a collection frequency, as such, can deter configuration modifications for short-lived changes in the set of scaling factor data, scaling factors, scaling factor values, or the like. Similarly, collection may occur in response to a usage event related to the workload such as a usage change exceeding a threshold with respect to the set of scaling factor data, scaling factors, scaling factor values, or the like (e.g., transaction processing by the workload decreases by 35%, number of users accessing the workload increases by 15%).

At block 420, a set of scaling factor data is monitored. For instance, monitoring can include querying (e.g., asking a question), searching (e.g., exploring for a reason), obtaining (e.g., recording a collection), probing (e.g., checking a property), scanning (e.g., reviewing a sample), or tracking (e.g., following a characteristic). To illustrate, the set of scaling factor data (e.g., which influences resource requirements) can include the number of transactions being processed, the number of users accessing the system, the number of entities being stored, etc. In embodiments, the set of scaling factor data can include a set of transaction processing scaling factor data 421 (e.g., number of transactions), a set of user access scaling factor data 422 (e.g., number of users), a set of entity storage scaling factor data 423 (e.g., number of objects for storage), a set of product usage scaling factor data 424 (e.g., number of entities being accessed/managed), or a set of provider-defined scaling factor data 425 (e.g., target scaling goals for the workload). For example, the set of transaction processing scaling factor data 421 may include 500 total transactions, 400 transactions per day, or twelve-hours of transactions. For instance, the set of user access scaling factor data 422 may include 100 total users, 45 current/active users, or 16 user-groups. Other possibilities related to the set of scaling factor data are considered and contemplated.

The set of scaling factor data is related to a workload on a configuration of the shared pool of configurable computing resources. Accordingly, the set of scaling factor data may indicate historical, current/actual, or expected/predicted asset/resource usage for the workload. The workload may include an instantiation of one or more images (e.g., a type/version of software configured to run) at block 427. The workload can include an active workload (e.g., a running workload, an available workload, an online workload) at block 428. As such, the set of scaling factor data may be collected/monitored with respect to the workload in a dynamic manner (e.g., in real-time while the workload is processing/operating). In embodiments, the configuration includes at least one of a configuration/arrangement of a set of processing resources at block 431 (e.g., 5 type A processors), a configuration/arrangement of a set of memory resources at block 432 (e.g., 2 gigabytes of type D memory), a configuration/arrangement of a set of disk resources at block 433 (e.g., 8 type H disk drives having 500 total gigabytes of storage), or a configuration/arrangement of a set of virtual machines at block 434.

At block 440, a set of workload resource data associated with the workload is ascertained. Ascertaining (e.g., finding-out, discovering, identifying) the set of workload resource data associated with the workload can include retrieving the set of workload resource data (e.g., from a registry). The set of workload resource data may include information received from a workload provider (e.g., company who designed software to execute such workloads). For example, applications/virtual appliance vendors may provide the set of workload resource data (e.g., information in the form of documentation or sizing tools) to be used with respect to resource requirements given some set of scaling factor values. In various embodiments, the set of workload resource data may indicate or map-to one or more configurations (e.g., based on one or more parameters/inputs/scaling factors). For example, the registry may store mappings of ranges to requirements (e.g., 1-500 transactions maps to 1 processor and 4 gigabytes of memory, 501-1000 transactions maps to 2 processors and 8 gigabytes of memory).

In certain embodiments, the set of workload data may be included/stored in a registry (e.g., a database, as part of the shared pool of configurable computing resources). For example, the registry can provide a programmatic interface for a supplier to register workload identifiers and supply their resource requirements based on scaling factors. Also, the registry can include the set of scaling factor data for a given workload and compute the resource requirements for the given workload. The registry may include a public registry (e.g., a publicly available database of templates/flavors defining one or more resource configurations), a nonpublic registry (e.g., a privately held database of templates/flavors defining one or more resource configurations), or a hybrid (e.g., combination of public/nonpublic).

At block 460, a triggering event is detected using the set of scaling factor data and the set of workload resource data. In general, the triggering event may occur when scaling factors change. For example, the set of scaling factor data and the set of workload resource data may be compared. If the resource requirements have changed from previous resource requirements, the triggering event may occur (and be detected). For example, scaling factor values may have initially had 200 transactions per hour with 15 users having access. Such values may be associated with 2 type B processors and 1 gigabyte of type F memory. In running the workload, 400 transactions may be being carried-out per hour with 30 users actually accessing. Under those circumstances, typically 4 type B processors and 1.5 gigabytes of type E may would be called-for. As such, the triggering event may be detected.

In embodiments, detecting the triggering event (using the set of scaling factor data and the set of workload resource data) includes identifying that a first value of a parameter of the set of scaling factor data differs with respect to a second value of the parameter of the set of workload resource data at block 465. For example, 400 transactions per hour (e.g., actual/current value) in the set of scaling factor data differs from 200 transactions per hour (e.g., initial/expected value) in the set of workload resource data. In various embodiments, by comparing the first value with the second value and using a threshold difference value, it may be computed that the threshold difference value is exceeded at block 466. For instance, the threshold difference value may be 100 transactions per hour. Since the first and second values differ by 200 transactions per hour (400−200=200), the threshold difference is exceeded. In certain embodiments, detecting the triggering event (using the set of scaling factor data and the set of workload resource data) includes identifying a trend in the set of scaling factor data at block 469. To illustrate, over time the amount of memory being used increases on an hour-over-hour basis. Thus, the trend of increasing memory can fulfill the triggering event (e.g., indicating potential appropriateness of a configuration action).

At block 480, a configuration action is performed. The configuration action occurs with respect to the configuration of the shared pool of configurable computing resources. The configuration action is performed in response to detecting the triggering event. In embodiments, the configuration action includes modifying the configuration of the shared pool of configurable computing resources at block 481. The configuration may be (dynamically) computed to resolve a flavor which specifies a size of a virtual machine for a type of workload and scale intended to be run/executed/processed. Accordingly, the configuration can be modified to process the workload (e.g., using one or more resized virtual machines). In certain embodiments, the configuration may be determined by resolving a set of resource attributes which indicates the configuration. Resolving the set of resource attributes can include determining/computing processing, memory, or disk types/features. For instance, various algorithms may be utilized which account for the set of scaling factor data. For certain workloads, a particular resource attribute such as memory may be prioritized with respect to another such processing power. For example, the set of resource attributes may be pulled from the registry to formulate an appropriate configuration.

For example, for a virtual machine resize operation, the shared pool manager may associate a virtual machine image (e.g., using the set of scaling factor data and other workload properties) with a workload identifier indicated in the set of workload data. The workload identifier can be associated with a configuration template/flavor and specified on the resize interfaces. To illustrate, the set of scaling factor data may include 950 expected transactions per day which can be accessed by 35 users. The set of workload data may indicate that for 900 to 1000 expected transactions per day which can be accessed by 20 to 50 users the appropriate configuration is identified as the flavor "2P-8M" which includes two processors and eight gigabytes of memory. In various embodiments, a workload estimator tool may be utilized which can define resource requirements or partition configurations.

In certain embodiments, a workload identifier is coupled with a configuration flavor (e.g., to form a couplet in a data store). The workload identifier can include a unique name, numeric, or other identifier for the workload within the shared pool or more globally. The configuration flavor can include an arrangement, organization, design, feature, component, or other aspect of one or more resources. The workload identifier and the configuration flavor may be coupled/connected/linked for efficiency in processing the determination of the configuration to be used. For example, certain couplets may be predetermined or computed in advance (e.g., the workload provided may have selected a configuration flavor based on how the workload was designed or for its intended usage). Other couplets may be based on machine learning or historical usage.

In various example embodiments, affinity/anti-affinity properties returned from a registry query for a workload identifier can return rules referencing other workload identifiers. A shared pool manager may use these rules to define its policies and filters in its placement arrangement logic. In certain example embodiments, storage types returned from the registry for a workload identifier can return information such as the required storage attachment technology (e.g. N-Port ID Virtualization (NPIV), Internet Small Computer System Interface (iSCSI)), number of paths to storage for redundancy and throughput, or Input/Output Operations Per Second (IOPS).

In various embodiments, in response to modifying the configuration of the shared pool of configurable computing resources, use of the configuration of the shared pool of configurable computing resources is metered at block 483. For example, the configuration may be measured based on factors such as quantity of assets configured, temporal periods of configuration/arrangement, actual usage of assets, available usage of assets, etc. Such factors may correlate to charge-back or cost burdens which can be defined in-advance (e.g., utilizing usage tiers) or scaled with respect to a market-rate. An invoice or bill presenting the usage, rendered services, fee, and other payment terms may be generated based on the metered use at block 484. The generated invoice may be provided (e.g., displayed in a dialog box, sent or transferred by e-mail, text message, traditional mail) to the user for notification, acknowledgment, or payment.

In certain embodiments, the configuration action can include a notification at block 489. For example, a notification may be provided regarding the configuration of the shared pool of configurable computing resources. In response to providing the notification, components may wait for a temporal period (e.g., 0 seconds, 2 minutes, 1 hours, 2 days). In response to waiting for the temporal period, the configuration of the shared pool of configurable computing resources may be modified.

Method 400 concludes at block 499. Aspects of method 400 may provide performance or efficiency benefits for managing a shared pool of configurable computing resources. For example, aspects of method 400 may have positive impacts with respect to resizing one or more virtual machines (e.g., properties, placement arrangement). Altogether, performance or efficiency benefits when managing a shared pool of configurable computing resources may occur (e.g., speed, load balancing, flexibility, responsiveness, resource usage, productivity).

Figure 5:
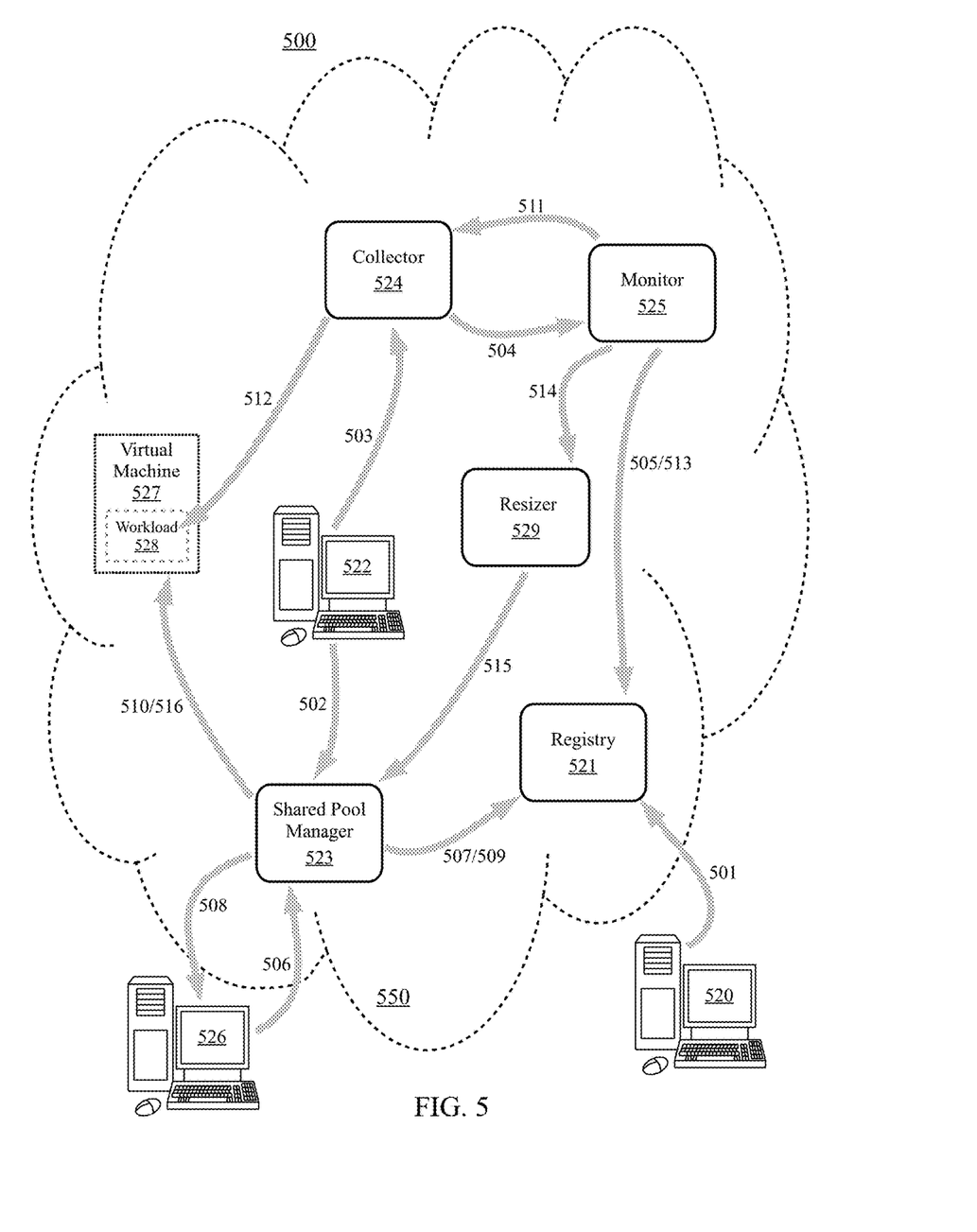
FIG. 5 shows an example system for managing a shared pool of configurable computing resources according to embodiments.

FIG. 5 shows an example system 500 for managing a shared pool of configurable computing resources according to embodiments. In embodiments, method 400 may be implemented within aspects of the example system 500 (e.g., within cloud environment 550). Components, features, or elements depicted in FIG. 6 need not be present, utilized, or located as such in every such similar system, and such components are presented as an illustrative example. Aspects of example system 500 may be implemented in hardware, software or firmware executable on hardware, or a combination thereof.

The shared pool of configurable computing resources (e.g., cloud environment 550) can include (but need not include) a shared pool manager 523, a registry 521, a resizer 529, a monitor 525, a collector 524, and a virtual machine 527 having a workload 528. One or more virtual machines can cooperate to provide a computing capability (e.g., store data using memory, process data using a processor). Workload provider 520, cloud management user 526, and cloud management administrator 522 may also be included in the example system 500. Disclosed aspects may associate a workload identifier with a virtual machine image in order to retrieve a set of scaling factor data (e.g., scaling factors and other workload properties) from the registry 521 (e.g., a workload resource requirements registry). Examples of scaling factors include number of transactions per hour, number of users, number of products, etc. Examples of other properties include affinity/anti-affinity rules and storage types. Of course, example system 500 could include many other features or other functions known in the art which are not shown in FIG. 5.

Aspects of example system 500 includes a Scaling Factor Monitor framework which includes the monitor 525, the collector 524, and the resizer 529. The Scaling Factor Monitor framework can prescribe programmable collection interfaces that when implemented, collect a set of scaling factor data (e.g., the current scaling factor values) for the workload 528. The collection interfaces could be implemented within one or more components making up the workload 528 or a separate piece of software that interrogates the workload 528 to ascertain/determine the set of scaling factor data (e.g., a third-party agent reads statistics which the workload software provides and implements the collection interfaces). The collector 524 may include an application program or software that implements the collection interfaces. The collector 524 may register credentials or a collection frequency with the monitor 525. The collection frequency can be configured to avoid resizes for temporary or short-lived changes in scaling factors.

The monitor 525 can retrieve/receive the set of scaling factor data or workload resource data for the workload 528 by using various interfaces. Using this information and credentials registered by the collector 524, the monitor 525 can periodically (e.g., based on a frequency value) invoke the collection interfaces to the collector 524 to retrieve/receive the set of scaling factor data (e.g., current scaling factor values) and may use the returned values to invoke a sizing logic to determine if a resize is required or may be beneficial. If so, it invokes the resizer 529. The resizer 529 can implement a set of interfaces that the Scaling Factor Monitor framework defines to initiate resize operations. The resizer 529 may use cloud management interfaces to perform a resize or send a notification to the cloud management administrator 522 to perform the resize.

FIG. 5 includes an example set of flow operations (some of which may be configured to repeat according to embodiments). At flow operation 501, the workload provider 520 may register a workload identifier, its scaling factors, and resource requirements based on scaling factors. At flow operation 502, the cloud management administrator 522 can registers workload identifier with a flavor. At flow operation 503, the cloud management administrator 522 may register credentials and frequency for the workload identifier with the collector 524. At flow operation 504, the collector 524 can register credentials and collection frequency for the workload identifier with monitor 525. At flow operation 505, the monitor 525 may get scaling factors for the workload identifier from the registry 521.

At flow operation 506, the cloud management user 526 may request to create a virtual machine for a flavor having a specific workload. At flow operation 507, the shared pool manager 507 can retrieve/receive scaling factors for the workload from the registry 521. At flow operation 508, the shared pool manager 523 may get values for the scaling factors from the cloud management user 526. At flow operation 509, the shared pool manager 523 can retrieve/receive resource requirements from the registry 521 given the scaling factor values and the workload. At flow operation 510, the shared pool manager 523 may use returned resource requirements in establishing an appropriately sized virtual machine 527.

At flow operation 511, a frequency may be registered and, using credentials for the workload and scaling factors, the monitor 525 can request the set of scaling factor data (e.g., scaling factor values) from the collector 524 for the workload 528. At flow operation 512, the collector may interface to the workload 528 in the virtual machine 527 to get the set of scaling factor data (in embodiments, the collector may be collecting these values on a separate polling schedule or via event-based methods). At flow operation 513, the monitor 525 may request resource requirements from the registry given the set of scaling factor data (e.g., the current scaling factor values). At flow operation 514, if the resource requirements have changed from previous resource requirements for the virtual machine 527, the monitor 525 may invoke the resizer 529 to initiate resizing the virtual machine 527. At flow operation 515, the resizer 529 may invoke the shared pool manager 523 to request the virtual machine 527 to be resized. At flow operation 516, the shared pool manager 523 can perform the virtual machine resize (or send a notification to the cloud management administrator 522 to perform the resize).

Aspects of example system 500 may provide performance or efficiency benefits when managing a shared pool of configurable computing resources. For example, aspects of system 600 may save resources such as bandwidth, processing, or memory (e.g., properly sized virtual machines). Altogether, a shared pool of configurable computing resources may be managed more efficiently.

In addition to embodiments described above, other embodiments having fewer operational steps, more operational steps, or different operational steps are contemplated. Also, some embodiments may perform some or all of the above operational steps in a different order. The modules are listed and described illustratively according to an embodiment and are not meant to indicate necessity of a particular module or exclusivity of other potential modules (or functions/purposes as applied to a specific module).

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

Embodiments of the present disclosure may also be delivered as part of a service engagement with a client corporation, nonprofit organization, government entity, internal organizational structure, or the like. These embodiments may include configuring a computer system to perform, and deploying software, hardware, and web services that implement, some or all of the methods described herein. These embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the foregoing is directed to exemplary embodiments, other and further embodiments of the invention may be devised without departing from the basic scope thereof, and the scope thereof is determined by the claims that follow. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A system of managing a shared pool of configurable computing resources, the system comprising:
   a memory having a set of computer readable computer instructions, and
   a processor for executing the set of computer readable instructions, the set of computer readable instructions including:
   collecting a set of scaling factor data related to an active workload on a configuration of the shared pool of configurable computing resources, wherein the set of scaling factor data includes an actual number of transactions per time period being processed;
   ascertaining a set of workload resource data associated with the active workload, wherein the set of workload resource data includes a hardware configuration template specifying a processor requirement and a memory requirement for an expected number of transactions per time period to be processed;
   computing, by subtracting the actual number of transactions per time period from the expected number of transactions per time period, a transaction per time period difference value;
   comparing the transaction per time period difference value to a transaction per time period difference threshold to determine whether the transaction per time period difference value exceeds the transaction per time period difference threshold;
   detecting, in response to a determination that the transaction per time period difference value exceeds the transaction per time period difference threshold, a triggering event; and
   performing, in response to detecting the triggering event, a configuration action with respect to the configuration of the shared pool of configurable computing resources, wherein the configuration action includes:
   reconfiguring the configuration of the shared pool of configurable computing resources.

2. The system of claim 1, further comprising:
waiting, in response to collecting the set of scaling factor data related to the active workload, for a temporal period; and
collecting, in response to waiting for the temporal period, the set of scaling factor data related to the active workload.

3. The system of claim 1, wherein the set of scaling factor data related to the active workload is collected in response to a usage event.

4. The system of claim 3, wherein the usage event includes a usage change exceeding a threshold with respect to the set of scaling factor data related to the active workload on the configuration of the shared pool of configurable computing resources.

5. The system of claim 1, wherein the set of scaling factor data is selected from a group consisting of:
a set of transaction processing scaling factor data, a set of user access scaling factor data,
a set of entity storage scaling factor data,
a set of product usage scaling factor data, and
a set of provider-defined scaling factor data which indicates one or more target scaling goals for the active workload.

6. The system of claim 1, wherein the configuration is selected from a group consisting of:
a configuration of a set of processing resources,
a configuration of a set of memory resources,
a configuration of a set of disk resources, and
a configuration of a set of virtual machines.

7. The system of claim 1, wherein detecting, using the set of scaling factor data and the set of workload resource data, the triggering event includes:
identifying a trend in the set of scaling factor data.

8. The system of claim 1, wherein ascertaining the set of workload resource data associated with the active workload includes:
retrieving, from a registry, the set of workload resource data indicated by a workload provider, wherein the set of workload resource data includes a configuration template for resource configurations.

9. The system of claim 8, further comprising:
storing the configuration template as a flavor having a processing component and a memory component;
storing, a first mapping of the flavor to a range of expected users;
storing, a second mapping of the flavor to a range of expected transactions; and
coupling the flavor mapped with the range of expected users and range of expected transactions with a workload identifier.

10. The system of claim 9, wherein the workload identifier indicates:
a required storage attachment technology,
a number of paths to storage for redundancy and throughput, and
a number of Input/Output Operations Per Second (IOPS).

11. The system of claim 1, wherein the configuration action includes: waiting for a temporal period; and
reconfiguring, in response to waiting for the temporal period, the configuration of the shared pool of configurable computing resources.

12. The system of claim 1, further comprising:
resizing, to reconfigure the configuration of the shared pool of configurable computing resources, one or more virtual machines.

13. The system of claim 12, further comprising:
monitoring, to monitor the set of scaling factor data related to the active workload on the configuration of the shared pool of configurable computing resources, the set of user access scaling factor data; and
detecting, using the set of user access scaling factor data, the triggering event.

14. The system of claim 12, further comprising:
monitoring, to monitor the set of scaling factor data related to the active workload on the configuration of the shared pool of configurable computing resources, the set of entity storage scaling factor data; and
detecting, using the set of entity storage scaling factor data, the triggering event.

15. The system of claim 12, further comprising:
monitoring, to monitor the set of scaling factor data related to the active workload on the configuration of the shared pool of configurable computing resources, a set of product usage scaling factor data, wherein the set of product usage scaling factor data includes a number of entities being accessed relating to the active workload; and
detecting, using the set of product usage scaling factor data, the triggering event.

16. The system of claim 12, further comprising:
monitoring, to monitor the set of scaling factor data related to the active workload on the configuration of the shared pool of configurable computing resources, a set of provider-defined scaling factor data; and
detecting, using the set of provider-defined scaling factor data, the triggering event.

17. The system of claim 1, wherein the set of scaling factor data is collected in response to an authorization using an authentication key.

18. A computer program product of managing a shared pool of configurable computing resources, the computer program product comprising a computer readable storage medium having program instructions embodied therewith, wherein the computer readable storage medium is not a transitory signal per se, the program instructions executable by a processor to cause the processor to perform a method comprising:
collecting a set of scaling factor data related to an active workload on a configuration of the shared pool of configurable computing resources, wherein the set of scaling factor data includes an actual number of transactions per time period being processed;
ascertaining a set of workload resource data associated with the active workload, wherein the set of workload resource data includes a hardware configuration template specifying a processor requirement and a memory requirement for an expected number of transactions per time period to be processed;
computing, by subtracting the actual number of transactions per time period from the expected number of transactions per time period, a transaction per time period difference value;
comparing the transaction per time period difference value to a transaction per time period difference threshold to determine whether the transaction per time period difference value exceeds the transaction per time period difference threshold;
detecting, in response to a determination that the transaction per time period difference value exceeds the transaction per time period difference threshold, a triggering event; and
performing, in response to detecting the triggering event, a configuration action with respect to the configuration of the shared pool of configurable computing resources, wherein the configuration action includes:

reconfiguring the configuration of the shared pool of configurable computing resources.

* * * * *